United States Patent [19]
Teders

[11] 3,737,748
[45] June 5, 1973

[54] MOTOR SPEED CONTROL CIRCUIT WITH UNIJUNCTION TRANSISTOR LINE VOLTAGE COMPENSATION

[75] Inventor: Phillip J. Teders, Ann Arbor, Mich.

[73] Assignee: Sarns, Inc., Ann Arbor, Mich.

[22] Filed: Nov. 3, 1971

[21] Appl. No.: 195,404

[52] U.S. Cl..................................318/331, 318/345
[51] Int. Cl...............................................H02p 5/16
[58] Field of Search..............................318/331, 345

[56] References Cited

UNITED STATES PATENTS

| | | | |
|---|---|---|---|
| 3,619,752 | 11/1971 | Bateika | 318/331 |
| 3,586,947 | 6/1971 | Ilk | 318/331 |
| 3,239,742 | 3/1966 | Mierendorf | 318/345 |
| 3,264,544 | 8/1966 | Bowers | 318/331 |
| 3,553,556 | 10/1971 | Dosch | 318/345 |

Primary Examiner—Bernard A. Gilheany
Assistant Examiner—Thomas Langer
Attorney—Arthur Raisch, John M. Kisselle, Robert A. Choate et al.

[57] ABSTRACT

An adjustable speed control circuit for a DC motor which automatically compensates for variations in both motor load and the voltage level of an AC source which supplies power for driving the motor. A command signal circuit and a reference signal circuit develop command and reference signals respectively which are applied to a solid state switch. The solid state switch operates in response to a certain differential between the command signal and the reference signal to cause current to be conducted from the AC source to the motor during the positive half-cycle of the AC voltage. The reference signal is a function of the AC line voltage and the command signal, a function of the AC line voltage, the motor armature voltage and the setting of an adjustable speed selector resistor in the command signal circuit. When the adjustable speed selector resistor is operated toward a minimum speed position, the necessary signal differential for operating the solid state switch occurs later in the positive half-cycle so that the duration of application of the positive half-cycle of AC line voltage to the motor armature is reduced; when operated toward a maximum speed position, earlier in the half-cycle so that the duration is increased. A change in motor load affects only the command signal so that the necessary differential for operating the solid state switch occurs either earlier in the positive half-cycle for an increased load or later in the positive half-cycle for a reduced load to thereby maintain the selected motor speed in spite of load changes. Any variation in AC line voltage affects both the command and reference signal circuits in offsetting fashion so that the point at which the necessary differential for operating the solid state switch occurs is at essentially the same point of the positive half-cycle.

29 Claims, 1 Drawing Figure

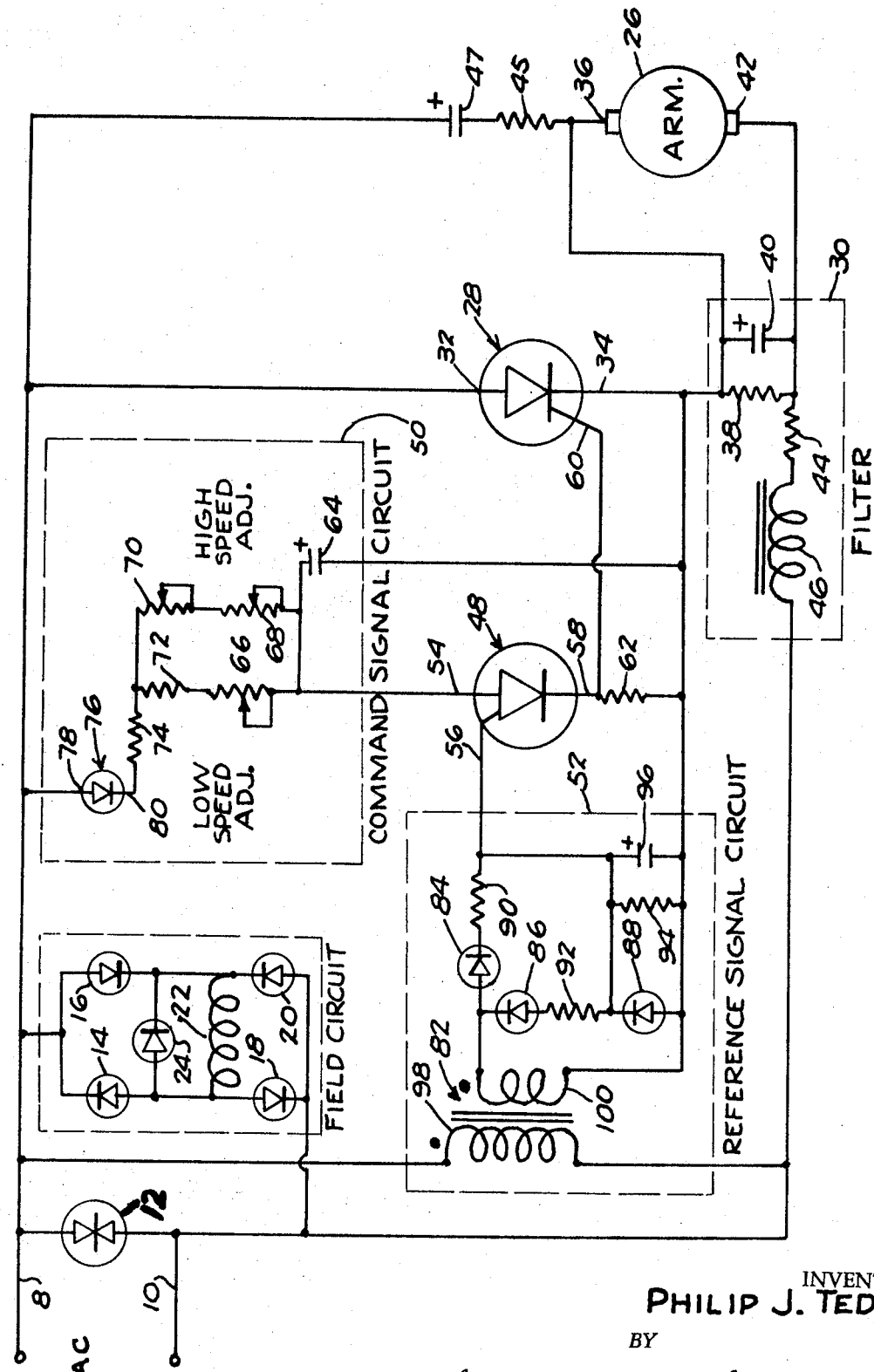

3,737,748

MOTOR SPEED CONTROL CIRCUIT WITH UNIJUNCTION TRANSISTOR LINE VOLTAGE COMPENSATION

This invention relates to motor control circuits and in particular to an adjustable speed control circuit for a DC motor which automatically compensates for variations in both motor load and the voltage level of an AC source which supplies power for driving the motor.

Because of the well-recognized advantages of DC motors in applications requiring adjustable speed control and because of the ready availability of AC power, various types of solid state motor controls have been developed for operating DC motors from AC power sources. In particular, one known type of motor control comprises a solid state switch, such as an SCR, which is controllably operated to connect the AC source to the DC motor during selected portions of the AC voltage cycle.

The present invention contemplates a novel arrangement for operating an SCR or similar type solid state switch to controllably deliver AC power to a DC motor so that the selected motor speed is maintained substantially constant in spite of variations in motor loading and voltage fluctuations in the AC source. The advantages which the invention provides include solid state circuit construction which offers economy of space and cost and high reliability; ease of adjustment at initial setup for making the control circuitry compatible with the motor which is to be controlled and convenient speed adjustment over a relatively large operating speed range.

Other objects, features and advantages of the invention will be apparent in the following description and claims in which the principles of operation are set forth together with the best mode presently contemplated for the practice of the invention.

The drawing illustrates a schematic diagram of an exemplary, but preferred, form of the motor control circuit of the invention.

Turning now to the drawing, AC power (e.g., 115v–60hz.) is supplied by lines 8 and 10 across which a thyrector 12 is connected to eliminate AC spikes which might interfere with the proper operation of the motor control circuit. A full wave rectifier bridge which comprises diodes 14, 16, 18 and 20 is connected across lines 8 and 10 to rectify the AC line voltage into pulsating DC which is delivered to the field winding 22 of the DC motor whose speed is being controlled. A surge protection diode 24 is conneccted across the diode bridge in parallel with field winding 22. AC lines 8 and 10 are electrically connected to the armature 26 of the DC motor by means of an SCR 28 and a filter 30. SCR 28, which, as will be seen, is controllably operated to provide regulated motor speed in accordance with the setting of an adjustable speed selector, has its anode terminal 32 connected directly to line 8 and its cathode terminal 34 to the positive terminal 36 of armature winding 26. Filter 30 provides smooth, quiet motor operation with armature 26 being paralleled by a resistor 38 and a capacitor 40 of filter 30 and the negative armature terminal 42 being conducted through the series combination of a resistor 44 and an inductor 46 of filter 30 to line 10. During positive half-cycles of the AC line voltage wherein line 8 is positive with respect to line 10, SCR 28 is controllably fired to conduct current from line 8 through armature 26 and filter 30 back to line 10. The series combination of a resistor 45 and a capacitor 47 is paralleled with the anode-cathode circuit of SCR 28 to protect SCR 28 from large rates of voltage change.

The novel circuit structure for operating SCR 28 comprises a programmable unijunction transistor 48 (PUT) which fires SCR 28 in accordance with a command signal derived from a command signal circuit 50 and a reference signal derived from a reference signal circuit 52. More specifically, PUT 48 has an anode terminal 54, an anode gate terminal 56 and a cathode terminal 58 and is operable in response to a certain voltage differential between its anode terminal 54 and its anode gate terminal 56 to conduct anode-cathode current. As will be seen in subsequent greater detail, this voltage differential is a function of the command and reference signals. Cathode terminal 58 is directly connected to gate terminal 60 of SCR 28 and a resistor 62 is electrically connected between gate 60 and cathode 34 of SCR 28. It is to be observed that as a result, cathode 58 of PUT 48 is electrically connected through resistor 62 to the positive armature terminal 36. With this arrangement, when a certain voltage is developed between terminals 54 and 56 of PUT 48, PUT 48 conducts anode-cathode current, a portion of which is conducted to gate 60 of SCR 28 to turn on the SCR. Therefore, SCR 28 is triggered essentially instantaneously with the operation of PUT 48 to cause current to flow from line 8 to terminal 36 of armature 26.

Command signal circuit 50 comprises a capacitor 64, adjustable resistors 66, 68 and 70, fixed resistors 72 and 74 and a diode 76. As can be seen, the anode terminal 78 of diode 76 is connected directly to line 8 and the cathode terminal 80 to one terminal of resistor 74. Resistors 66 and 68 are individually arranged in series with resistors 72 and 70 respectively forming two series resistance combinations which are paralleled with each other and connected between the other terminal of resistor 74 and one terminal of capacitor 64. The other terminal of capacitor 64 is connected directly to the positive armature terminal 36. The common connection point of resistors 66 and 68 and capacitor 64 is connected to anode terminal 54 of PUT 48 so that capacitor 64 is effectively in parallel with the anode-cathode circuit of PUT 48 and resistor 62. Command signal circuit 50 operates as an RC circuit wherein capacitor 64 charges during positive half-cycles of AC line votage to develop a positive voltage at anode 54 of PUT 48 at a rate which is a function of (1) the effective resistance in series with the capacitor and (2) the voltage differential between the AC line voltage and the motor armature voltage. The current flow path for charging capacitor 64 is from line 8, through diode 76, through the resistors of command signal circuit 50, through capacitor 64 and then in parallel paths through filter 30 and armature 26 back to line 10. Upon the firing of PUT 48, a low-impedance path is provided between anode 54 and cathode 58 through which capacitor 64 discharges to in turn trigger SCR 28. As will be more fully appreciated from later description, adjustment of the adjustable resistors 66 and 68 establishes upper and lower limits for motor speed while adjustable resistor 70 provides speed selection within the range defined by the upper and lower limits. The functional relationship between the charging rate of capacitor 64 and the voltage differential between AC line voltage and motor armature voltage will be subsequently explained in greater detail to illustrate how the control circuit compensates for variations in both AC line voltage and motor loading to achieve regulated motor speed.

Reference signal circuit 52 comprises a stepdown voltage transformer 82, diodes 84, 86 and 88, resistors 90, 92 and 94 and a capacitor 96. The primary winding 98 of transformer 82 is connected directly across lines 8 and 10. The remaining elements which comprise reference signal circuit 52 are electrically connected as two parallel branches across the secondary winding 100 of transformer 82. The first branch comprises the series string consisting of diode 84, resistor 90 and the parallel combination of resistor 94 and capacitor 96; the second branch, the series string consisting of diode 86, resistor 92 and the parallel combination of diode 88, resistor 94 and capacitor 96. The common connection point of resistor 90 and capacitor 96 is directly connected to anode gate terminal 56 of PUT 48 while the common connection of secondary 100 and capacitor 96 is directly connected to the positive armature terminal 36. Thus, capacitor 96 is effectively paralleled with the anode gate — cathode circuit of PUT 48 and resistor 62. The connection of transformer 82 is such that a positive secondary voltage is developed during positive half-cycles of AC line voltage to forward bias diode 84 and charge capacitor 96 through resistor 90. Thus, during positive half-cycles of AC line voltage, current flows in the first branch to charge capacitor 96 which develops a positive voltage at the anode gate terminal 56 of PUT 48. During negative half-cycles of AC line voltage, the negative secondary voltage of transformer 82 forward biases diode 86 so that the second branch provides a discharging path for discharging the charge which had been developed on capacitor 96 during the previous positive half-cycle of AC line voltage. The operation of PUT 48 has no significant effect upon the charging or discharging of capacitor 96. Because the circuit elements of reference signal circuit 52 are nonadjustable, the voltage delivered to anode gate terminal 56 by reference signal circuit 52 is a function only of the magnitude of the AC line voltage.

Turning now to the operating description of the illustrated circuit, let it be assumed that the motor load is constant and that the peak-to-peak amplitude of the AC line voltage is also constant. Furthermore, let it be assumed that lower and upper speed limiting resistors 66 and 68 are in adjustment and that speed selector resistor 70 is set in the middle of its range. Considering first the operation of command signal circuit 50, during the positive half-cycle of the AC line voltage, capacitor 64 charges. However, the voltage rise across capacitor 64 lags the AC line voltage because (1) the AC line voltage must rise to a positive magnitude sufficient to overcome the bucking voltage of armature 26 and (2) thereafter the voltage rise is further delayed because of the inherent phase delay in an RC network. Therefore, when the instantaneous magnitude of the AC line voltage exceeds the motor armature voltage, diode 76 becomes forward biased and capacitor 64 begins charging at a rate determined by the equivalent series resistance between capacitor 64 and diode 76.

Also during the positive AC half-cycle, the positive voltage developed in secondary 100 of transformer 82 forward biases diode 84 to begin charging capacitor 96. Here, the only delay in the voltage rise across capacitor 96 is the inherent RC delay. Correspondingly, during the positive AC half-cycle the voltage at anode gate terminal 56 is initially greater than the anode voltage at terminal 54. However, because the secondary voltage of transformer 82 is reduced in amplitude from the AC line voltage, reference signal circuit 52 cannot charge capacitor 96 to as great a voltage as capacitor 64 is charged via line 8. Therefore, at a certain point in the positive half-cycle, the voltage at anode 54 exceeds the voltage at anode gate 56 by an amount which is sufficient to fire PUT 48. The firing point in the positive half-cycle is such that the amount of power delivered through SCR 28 during the remaining portion of the positive half-cycle is sufficient to drive the motor load while maintaining the motor speed.

As previously mentioned, resistor 70 may be adjusted to vary the motor speed. When resistor 70 is adjusted to increase the resistance in series with capacitor 64, the charging rate of capacitor 64 decreases. Thus, a longer time is required to develop a sufficient voltage across capacitor 64 to fire PUT 48. Therefore, SCR 28 is operated later in the half-cycle with concomitant reduction in power delivery to armature 26; hence, the motor speed drops. On the other hand, if resistor 70 is adjusted to decrease the resistance in series with capacitor 64, capacitor 64 charges more rapidly to develop the requisite voltage for firing PUT 48 earlier in the half-cycle. As a result, SCR 28 fires sooner to deliver increased power to armature 26; hence, motor speed increases.

To illustrate how the circuit of the invention provides good speed regulation despite variations in motor loading, let it be assumed that the peak-to-peak AC line voltage is constant and the speed selection resistor 70 is set to a selected speed but that the motor load now increases. The increased motor loading results in a drop in motor armature voltage. This reduction in armature voltage results in the AC line voltage overcoming the armature voltage earlier in the half-cycle so that capacitor 64 begins charging earlier in the half-cycle. Because reference signal circuit 52 is floating with armature 26, the reference signal is unaffected by the increased motor load. As a result of the command signal being developed earlier in the half-cycle, the necessary firing voltage for operating PUT 48 is likewise developed earlier in the half-cycle. This earlier firing delivers increased power to armature 26 to overcome the motor loading and enable the motor speed to be maintained in accordance with the setting of resistor 70. When motor loading is reduced, the charging of capacitor 64 begins later in the half-cylle and this similarly delays the application of AC line voltage to armature 26.

To illustrate how the control circuit compensates for variations in AC line voltage, let it be assumed that the motor load is constant and the speed selector resistor 70 is set to a selected speed, but that the peak-to-peak amplitude of the AC line voltage increases. This increased line voltage increases the rate of voltage rise at capacitor 96 because of the increased voltage developed in secondary winding 100 of transformer 82. Thus, the reference signal increases more rapidly. However, the increased line voltage similarly increases the rate at which the command signal voltage rises. Therefore, these changes in the command reference signals have more or less an offsetting effect so that the increased line voltage does not cause PUT 48 to fire at an appreciably different time in the positive half-cycle. The net effect is to substantially reduce any more speed variations which would otherwise accompany changes in the line voltage. The effect of decreases in AC line voltage likewise tend to offset one another.

The adjustment of adjustable resistors 66 and 68 to set lower and upper speed limits for the motor is as follows. First, adjustable speed selection resistor 70 is set to the minimum speed position so that the full resistance thereof is in circuit. Resistor 66 is then adjusted to bring motor speed to the desired low speed limit. Next, resistor 70 is set to the maximum speed position, removing the resistance thereof from circuit. Resistor 68 is now adjusted to bring motor speed to the desired upper speed limit. As should be apparent, adjustment of resistor 68, while primarily setting the upper speed limit, does affect the low speed limit; similarly, adjustment of resistor 66, which primarily establishes the low speed limit, does influence the upper speed limit. Consequently, it is to be understood that slight readjustment of resistors 66 and 68 may be necessary to precisely bring the motor speed range to within the desired limits. Thereafter, adjustable speed selection resistor 70 may be operated to any position between minimum and maximum speed positions to operate the motor at the selected speed within the operating speed range. Because adjustable selection resistor 70 may be located at a control console with the other resistors of command signal circuit 50 being remotely located in an electrical control cabinet, resistor 74 serves to protect diode 76 should the lead between diode 76 and resistor 70 become grounded for one reason or another.

In the preferred embodiment of the invention, the lower limit of motor speed is zero rpm and therefore, SCR 28 is not triggered during the positive AC half-cycles. However, at the end of the positive half-cycle, a small charge has built up on capacitor 64. In this event, reference signal circuit 52 fires PUT 48 during the negative AC half-cycle to discharge capacitor 64. This is done because the illustrated reference signal circuit 52 develops a reference signal which may be generally described as a pulsating DC voltage having a frequency equal to the frequency of the AC line voltage. Thus, during the positive half-cycle of AC line voltage the reference signal voltage rises from essentially zero volts to a maximum, and during the negative half-cycle of AC voltage the reference signal returns from this maximum back to approximately zero volts. Thus, at some point on the decreasing portion of the reference signal waveform, a sufficient voltage differential is provided between terminals 54 and 56 of PUT 48 to fire the PUT thereby discharging capacitor 64 into resistor 62 and gate 60 of SCR 28. Thus, capacitor 64 is discharged during the negative half-cycle of AC line voltage so that capacitor 64 always has the same initial voltage at the beginning of each positive half-cycle.

At the conclusion of the specification, there is a parts list of actual circuit values which have been successfully utilized in controlling the operation of a one-eighth horesepower DC motor having a speed range of 0 – 2,000 rpm. With such a circuit construction, the motor is operated at 0 – 120 volts DC from 115 volts 50 – 60 hz. AC power. It is contemplated that this specific circuit structure may be modified in accordance with known design formulations to accommodate different sizes of motors and different sources of AC power. Furthermore, it is contemplated that modification may be had to the command and reference signal circuits to develop command and reference signals of various waveshapes for operating PUT 48 in a manner not inconsistent with the principles set forth in this disclosure.

| | |
|---|---|
| Thyrector 12 | G.E. No. 20S4 |
| Diodes 14, 16, 18, 20, 76, 84, 86, 88 | 1N5404 |
| Diode 24 | G.E. No.20V6 |
| SCR 28 | 2N4443 |
| Resistor 38 | 12K 2W |
| Capacitor 40 | 300 MFD 250 V |
| Resistor 44 | 2 ohms 40W |
| Resistor 45 | 10 ohms 1/2W |
| Inductor 46 | 0.1 henery |
| Capacitor 47 | 0.01 MFD 1,000V |
| PUT 48 | 2N6027 |
| Resistor 62 | 220 ohms 1/2W |
| Capacitor 64 | 0.25 MFD 75 VDC |
| Resistor 66 | 2 MEG |
| Resistor 68 | 1 MEG |
| Resistor 70 | 1 MEG |
| Resistor 72 | 1 MEG |
| Resistor 74 | 33 K |
| Transformer 82 | 115 VAC/7.2 VAC PRI / SEC |
| Resistor 92 | 1,000 ohms 1/2W |
| Resistor 94 | 10K 1/2W |
| Capacitor 96 | 10 MFD 40V |

I claim:

1. In a motor speed control circuit for controlling the speed of a shunt-wound DC motor, said circuit being of the type comprising an AC voltage source and solid state switch means operable during a controlled fraction of one half-cycle of the AC source voltage to conduct half-wave rectified current from said AC source to the motor armature in response to an operating signal which is controllably phased relative to the AC source voltage, the combination comprising reference signal circuit means electrically connected to said AC voltage source and including a first RC timing circuit responsive to the AC source voltage for developig a time-varying reference signal which is a function of the AC source voltage, command signal circuit means including a second RC timing circuit electrically connected to said AC voltage source and to the motor armature for developing a time-varying command signal which is a function of the AC source voltage and the motor armature voltage, programmable switch means electrically connected to said command signal circuit means, to said reference signal circuit means and to said solid state switch means and responsive to the command signal and the reference signal for developing said controllably phased operating signal for said solid state switch means, said operating signal being of such controlled phase relationship relative to the AC source voltage that when the motor armature voltage changes thereby indicating a change in motor load, said operating signal is generated earlier in said half-cycle of the AC source voltage in response to increased motor load so that said solid state switch means is operable for an increased fraction of said half-cycle of the AC source voltage and is generated later in said half-cycle of the AC source voltage in response to reduced motor load so that said solid state switch means is operable for a reduced fraction of said half-cycle of the AC source voltage and when the peak-to-peak amplitude of the AC source voltage changes, said operating signal is substantially unchanged in phase relative to the AC source voltage, whereby compensation is provided for variations in both motor loading and the AC source voltage to maintain substantially constant motor speed.

2. The combination of claim 1 wherein said circuit further includes speed adjustment means for varying the command signal relative to the reference signal to thereby vary the phase of said operating signal relative to the AC source voltage and cause the motor to operate at a speed correlated to the setting of said speed adjustment means.

3. The combination of claim 2 wherein said speed adjustment means is in said command signal circuit means and varies said command signal.

4. The combination of claim 3 wherein said speed adjustment means comprises adjustable resistance means.

5. The combination of claim 1 wherein said command signal circuit means is responsive to the voltage differential between the peak amplitude of the AC source voltage and the motor armature voltage such that the command signal is a function of the voltage differential between the peak amplitude of the AC source voltage and the motor armature voltage.

6. The combination of claim 5 wherein for a constant peak-to-peak amplitude of the AC source voltage said command signal circuit means causes said programmable switch means to generate said operating signal earlier in said half-cycle of the AC source voltage in response to increased differential between the AC source and armature voltages and later in said half-cycle in response to reduced differential.

7. The combination of claim 5 wherein for a constant motor load said command signal circuit means and said reference signal circuit means are responsive to a change in the peak-to-peak amplitude of the AC source voltage such that the changes in the command signal and the reference signal have substantially offsetting effects relative to said programmable switch means so as to cause the phase of said operating signal relative to the AC source voltage to remain substantially unchanged.

8. The combination of claim 1 wherein said programmable switch means comprises a programmable unijunction transistor having an anode terminal, an anode gate terminal and a cathode terminal and electrically connected to said reference signal circuit means and to said command signal circuit means such that the reference signal is applied as a reference voltage signal at the anode gate terminal relative to the cathode terminal and the command signal is applied as a command voltage signal at the anode terminal relative to the cathode terminal to thereby develop a control voltage signal between the anode gate t1rminal and the anode terminal, said programmable unijunction transistor being operable in response to a certain magnitude of the control voltage signal for generating said operating signal for said solid state switch means.

9. The combination of claim 8 wherein said command signal circuit means is constructed to develop the command signal such that the magnitude thereof increases from an initial signal level during said half-cycle of the AC source voltage and said reference signal circuit means is constructed to develop the reference signal such that the magnitude thereof increases from an initial signal level during said half-cycle of the AC source voltage.

10. The combination of claim 9 wherein the initial signal level of said command signal relative to the initial signal level of said reference signal is less than the certain magnitude of the control voltage signal for generating said operating signal.

11. The combination of claim 10 wherein said command signal circuit means develops said command signal at a rate greater than that at which said reference signal circuit means develops said reference signal after the magnitude of said command signal and the magnitude of said reference signal begin increasing from their respective initial signal levels.

12. The combination of claim 8 wherein said command signal circuit means is constructed to develop the command signal such that the magnitude thereof increases in the positive direction from an initial signal level during the initial portion of said half-cycle of the AC source voltage and said reference signal circuit means is constructed to develop the reference signal such that the magnitude thereof increases from an initial signal level during said initial portion of said half-cycle of the AC source voltage, the initial signal level of the command signal relative to the initial signal of the reference signal being less than the certain magnitude of the control voltage signal for generating said operating signal.

13. The combination of claim 12 wherein said command signal circuit means is constructed to develop the command signal at a rate greater than that at which the reference signal circuit means develops the reference signal once said signals begin increasing from their respective initial signal levels.

14. The combination of claim 12 wherein said command signal circuit means is constructed to develop the command signal such that the time rate of change of the command signal magnitude increases with increasing motor load to thereby cause the certain magnitude of the control voltage signal for generating said operating signal to be developed earlier in said half-cycle of the AC source voltage and decreases with decreasing motor load to thereby cause the certain magnitude of the control voltage signal for generating said operating signal to be developed later in said half-cycle of the AC source voltage, whereby compensation is provided for variations in motor loading.

15. The combination of claim 12 wherein said command signal circuit means and said reference signal circuit means are constructed to develop the command and reference signals respectively such that the time rate of change of the magnitude of the command signal and the time rate of change of magnitude of the reference signal are functions of the peak amplitude of the AC source voltage which so change relative to each other in response to a change in the peak amplitude of the AC source voltage that the certain magnitude of control voltage signal for generating said operating signal is developed at a relatively unchanged point in said half-cycle of the AC source voltage whereby compensation is provided for variations in the peak-to-peak amplitude of the AC source voltage.

16. The combination of claim 8 wherein said second timing circuit comprises a command capacitor and means for developing the command voltage signal as a time-varying voltage across said capacitor, which voltage is a function of the AC source voltage and the motor armature voltage.

17. The combination of claim 16 wherein said capacitor is electrically connected in parallel with the anode-cathode circuit of said programmable unijunction transistor to cause the time-varying command voltage signal to be applied across the anode-cathode circuit thereof.

18. The combination of claim 17 wherein said means for developing the time-varying command voltage signal comprises means for developing the command voltage signal at the anode of said programmable unijunction transistor relative to the cathode thereof such that the magnitude of the command voltage signal increases from an initial voltage level during said half-cycle of the AC source voltage.

19. The combination of claim 18 wherein said reference signal circuit means is constructed to develop said reference voltage signal as a time-varying voltage which is a function of the AC source voltage.

20. The combination of claim 19 wherein said reference signal circuit means comprises means for developing the reference voltage signal such that the magnitude thereof increases from an initial voltage level during said half-cycle of the AC source.

21. The combination of claim 20 wherein said command signal circuit means and said reference signal circuit means are constructed such that the differential between the initial levels of said reference voltage signal and of said command voltage signal is less than the certain magnitude of the control voltage signal for generating said operating signal and the differential between the reference voltage signal and the command voltage signal increases during said half-cycle of the AC source voltage.

22. The combination of claim 21 wherein the increasing differential between the reference voltage signal and the command voltage signal reaches the certain magnitude of the control voltage signal for generating said operating signal during said half-cycle of the AC source voltage.

23. The combination of claim 22 wherein the point in said half-cycle at which the differential between the reference signal voltage and the command signal voltage reaches the certain magnitude of the control voltage signal for generating the operating signal is such that for a selected motor speed and a selected motor load the controlled fraction of said half-cycle of the AC voltage during which said AC source is electrically connected to the motor armature is of such duration that energy delivered from said AC source to the motor powers the selected motor load while maintaining the selected motor speed.

24. The combination of claim 23 further including speed adjustment means for controlling the rate of increase of said command voltage signal such that the rate of increase is reduced in response to adjustment of said speed adjustment means toward a minimum speed position to thereby develop the certain magnitude of the control voltage signal for generating said operating signal later in said half-cycle of the AC source voltage and the rate of increase is increased in response to adjustment of said speed adjustment means toward a maximum speed position to thereby generate the certain magnitude of the control voltage signal for generating said operating signal earlier in said half-cycle of the AC source voltage.

25. The combination of claim 24 wherein said first RC timing circuit comprises a reference capacitor and means for developing the reference voltage signal as a time-varying voltage across said reference capacitor.

26. The combination of claim 25 wherein said means for developing the reference voltage signal is constructed such that the reference voltage signal increases from an initial signal level during substantially said half-cycle of the AC source voltage to a maximum signal level and decreases from the maximum signal level to the initial signal level during the remaining portion of the cycle of the AC source voltage.

27. The combination of claim 25 wherein said reference capacitor is electrically connected in parallel with the anode gate - cathode circuit of said programmable unijunction transistor and the electrical connection of said two capacitors to the cathode of said programmable unijunction transistor is electrically connected to the positive terminal of the motor armature.

28. The combination of claim 25 wherein said reference signal circuit further comprises a stepdown transformer connected to said AC source for reducing the magnitude of the AC source voltage applied to said first timing circuit.

29. The combination of claim 17 wherein the electrical connection between said command capacitor and the cathode of said programmable unijunction transistor is electrically connected to one terminal of the motor armature, the other terminal of the motor armature is electrically connected to one terminal of the AC voltage source and said command signal circuit means is electrically connected to the other terminal of said AC voltage source and said means for developing the command voltage signal includes means for restricting current flow from said AC source to unidirectional flow from said other terminal of said AC source through said capacitor and through the motor armature to said one terminal of the AC source to develop said increasing command voltage signal across the anode-cathode circuit of said programmable unijunction transistor during an initial fraction of said half-cycle of the AC source voltage.

* * * * *